United States Patent [19]
Moriarty, Jr.

[11] Patent Number: 5,856,919
[45] Date of Patent: Jan. 5, 1999

[54] QUASIRESONANT BOOST POWER CONVERTER WITH BIDIRECTIONAL INDUCTOR CURRENT

[75] Inventor: John K. Moriarty, Jr., Reading, Pa.

[73] Assignee: Lucent Technologies Inc., Murray Hill, N.J.

[21] Appl. No.: 842,145

[22] Filed: Apr. 23, 1997

Related U.S. Application Data

[60] Provisional application No. 60/009,353, Dec. 29, 1995.

[51] Int. Cl.$^6$ .............................. H02M 7/00; G05F 1/00
[52] U.S. Cl. ........................................... 363/101; 323/222
[58] Field of Search .............................. 363/59, 101, 125, 363/127; 323/223, 222; 315/209 R, 215, 226, 307

[56] References Cited

U.S. PATENT DOCUMENTS

| | | |
|---|---|---|
| 5,113,337 | 5/1992 | Steigerwald . |
| 5,235,504 | 8/1993 | Sood . |
| 5,307,004 | 4/1994 | Carsten . |
| 5,488,269 | 1/1996 | El-Hamamsy et al. .................. 315/307 |
| 5,615,101 | 3/1997 | Moriarty ................................. 363/101 |
| 5,701,243 | 12/1997 | Youn et al. ............................... 363/89 |
| 5,708,330 | 1/1998 | Rothenbuhler et al. ................ 315/224 |

OTHER PUBLICATIONS

"High Power Preregulator", by Integrated Circuits Unitrode, Product & Applications Handbook 1993–94, pp. 5–218 to 5–225.

"New Integrated Electronic Ballast Chip Set", by John K Moriarty, Jr. and Thomas E. Truax, Power Conversion, Sep. 1994 Proceedings, pp. 280–287.

*Primary Examiner*—Matthew V. Nguyen

[57] ABSTRACT

A boost power converter for powering a load with an AC power source. The boost power converter has an energy storage device, a resonant circuit, a resonator switch circuit, a boost inductor circuit with a boost inductor, and a boost switch circuit. The resonator switch circuit alternately connects the resonant circuit to different sides of the energy storage device, where power from the energy storage device is transferred by the resonant circuit to the load. The boost switch circuit selectively connects the boost inductor to the resonator switch circuit, such that the boost inductor is charged in one of two different directions depending on the phase of the AC power source. The boost power converter is well-suited for ballast applications that drive a fluorescent lamp.

20 Claims, 2 Drawing Sheets

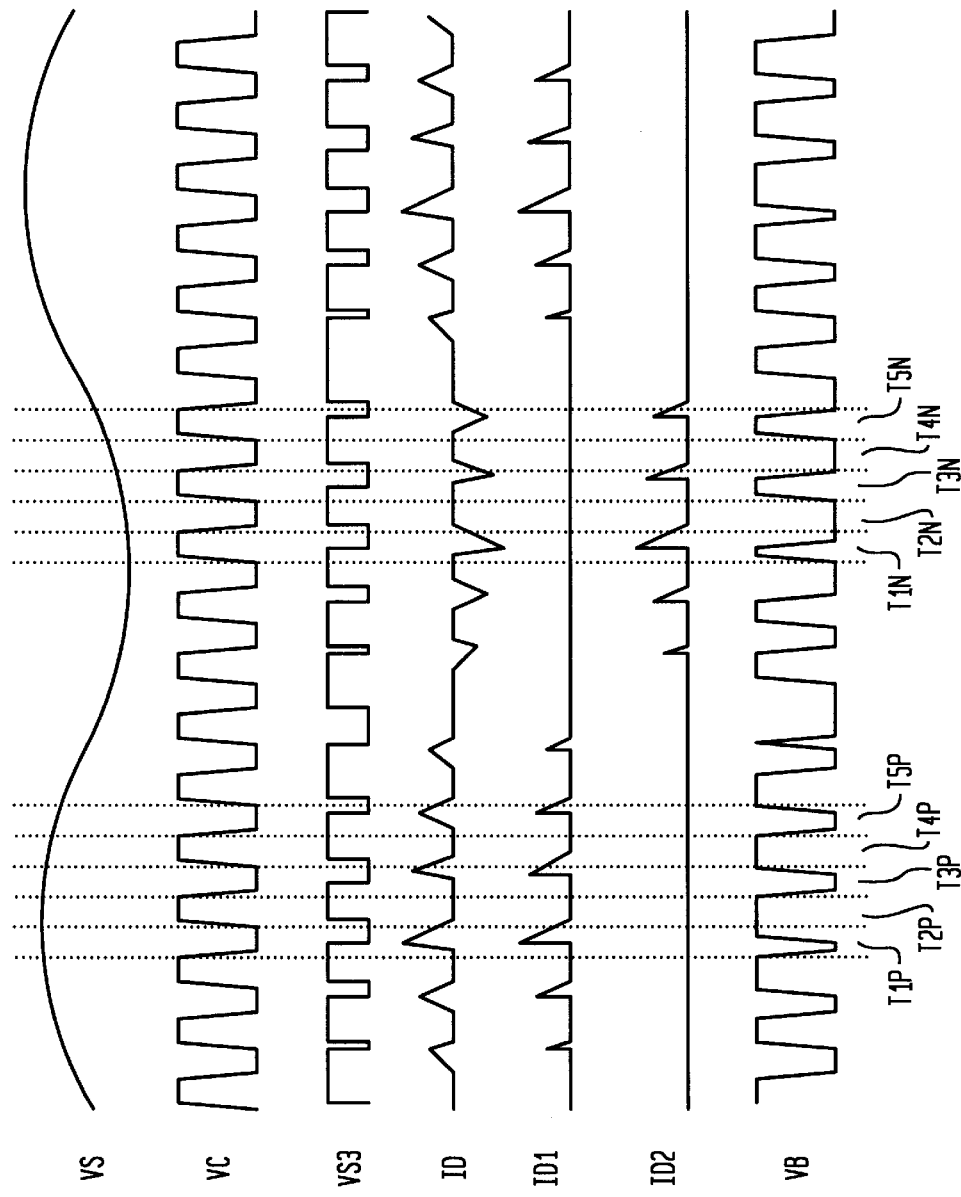

QUASIRESONANT BOOST POWER CONVERTER WITH BIDIRECTIONAL INDUCTOR CURRENT

BACKGROUND OF THE INVENTION

This application is related to U.S. application Ser. No. 08/365,656, filed Dec. 29, 1994 as "Moriarty 3," and U.S. Provisional Application Ser. No. 60/009,353, filed Dec. 29, 1995 as "Moriarty 5" and converted to U.S. application Ser. No. 08/769,984 on Dec. 19, 1996, all three of which are incorporated herein by reference.

1. Field of the Invention

The invention relates generally to power converters, and, more particularly, to a power converter with a boost circuit for powering a load from an AC source. The invention is well-suited for resonant ballast applications.

2. Description of the Related Art

The two primary functions of a fluorescent lamp ballast are well known. First, to create enough voltage to start the lamp, and second, to limit the current once the lamp is started. For many years, both functions of a fluorescent lamp ballast were achieved by the use of magnetics, with a transformer to step up the voltage and an inductor to limit the current.

In recent years, electronic ballasts have been frequently used instead of magnetic ballasts to control fluorescent lamps and other non-linear loads. Compared to magnetic ballasts, electronic ballasts are smaller and lighter, do not have flicker associated with 60-Hz power mains, and are more efficient. Electronic ballasts are especially desirable for powering the compact, consumer fluorescent lamps that are becoming more popular.

Most compact electronic ballasts consist of discrete components, including power transistors and pulse transformers. A typical electronic ballast includes a half-bridge totem pole driver formed from two discrete power MOSFETs of bipolar transistors. The half-bridge output drives a resonant load by means of feedback from a pulse transformer whose primary winding is connected in series with the load. The two secondary windings of the transformer are connected to the inputs of the two half-bridge transistors such that the load is driven synchronously. The LC resonating elements provide substantially sinusoidally varying voltage and/or current waveforms. Driving the load in such a self-synchronous fashion allows a switching frequency at the load that is much higher than the line frequency. As a result, much smaller reactive components may be used to reduce the bulk and size of the ballast.

A disadvantage of typical electronic ballasts is a low power factor. That is, the current drawn from the power source is out of phase with the voltage of the source. Typically, the current leads the voltage, e.g., by approximately 50 to 60%. The low power factor is largely due to a peak detector rectifier that allows power to be drawn from the source only when the source voltage is higher than the load voltage. The low power factor not only wastes energy, but tends to inject high-frequency harmonics into the line. The total harmonic distortion might violate FCC regulations and/or disrupt other circuits connected to the line. A large capacitor in shunt with the line reduces total harmonic distortion, but is also likely to reduce the power factor.

A buck-boost power converter that operates with a high power factor is disclosed in U.S. application Ser. No. 08/365,656. A similar buck-boost power converter is disclosed in J. Moriarty et al., "New Integrated Electronic Ballast Chip Set," *Proceedings of the Twenty-Ninth International Power Conversion Conference,* September 1994, pp. 280–287, which is incorporated herein by reference. These buck-boost power converters are simple to control and have a high power factor since current drawn from the source to charge an inductor is in phase with the voltage of the source. A disadvantage, however, is that high peak currents result in high power dissipation and harmonic distortion.

Therefore, a need exists for a power converter that operates with a high power factor and low harmonic distortion.

SUMMARY OF THE INVENTION

Embodiments of the present invention are directed to a boost power converter for powering a load with an AC power source. The boost power converter comprises an energy storage device, a resonant circuit, a resonator switch circuit, a boost inductor circuit, and a boost switch circuit. The resonator switch circuit is adapted to alternately connect the resonant circuit to different sides of the energy storage device, wherein power from the energy storage device is transferred by the resonant circuit to the load. The boost switch circuit is adapted to selectively connect the boost inductor circuit to the resonator switch circuit, such that a boost inductor of the boost inductor circuit is charged in one of two different directions depending on the phase of the AC power source.

Alternative embodiments of the present invention are directed to a method for powering a load with an AC power source. The AC power source is applied through a boost inductor and the boost inductor is selectively coupled to a resonator switch circuit to cause a bidirectional current through the boost inductor in phase with a voltage of the AC power source. A boosted voltage is applied from the boost inductor to an energy storage device and energy is alternately applied from the energy storage device to the resonant circuit for powering the load.

Preferably, the resonator switch circuit operates in a substantially fully resonant mode with zero-voltage switching between the different sides of the energy storage device (e.g., high voltage and ground), and the boost inductor circuit operates in a quasi-resonant mode with low slew rates. The power converter is well-suited for ballast applications in which the load is a fluorescent lamp.

Preferably, a power-factor correction controller charges the boost inductor with the AC power source in phase with the source voltage, and discharges the inductor into the energy storage device. The power-factor correction controller discharges the charged inductor by opening the third switching device in response to the source current and source voltage.

Advantageously, a power converter according to the present invention can utilize a power-factor correction controller to control a boost circuit coupled to a substantially fully resonant ballast to provide a quasi-resonant boost circuit with low slew rates. In this manner, the power converter achieves both a high power factor and low harmonic distortion. The zero-voltage switching, quasi-resonant operation also provides reduced switching losses, reduced stresses, and improved power efficiency.

BRIEF DESCRIPTION OF THE DRAWING

Other aspects, features, and advantages of the present invention will become more fully apparent from the following detailed description, the appended claims, and the accompanying drawings in which:

FIG. 2 is a waveshape diagram illustrating signal waveshapes of the boost power converter of FIG. 2.

DETAILED DESCRIPTION

Figure 1:
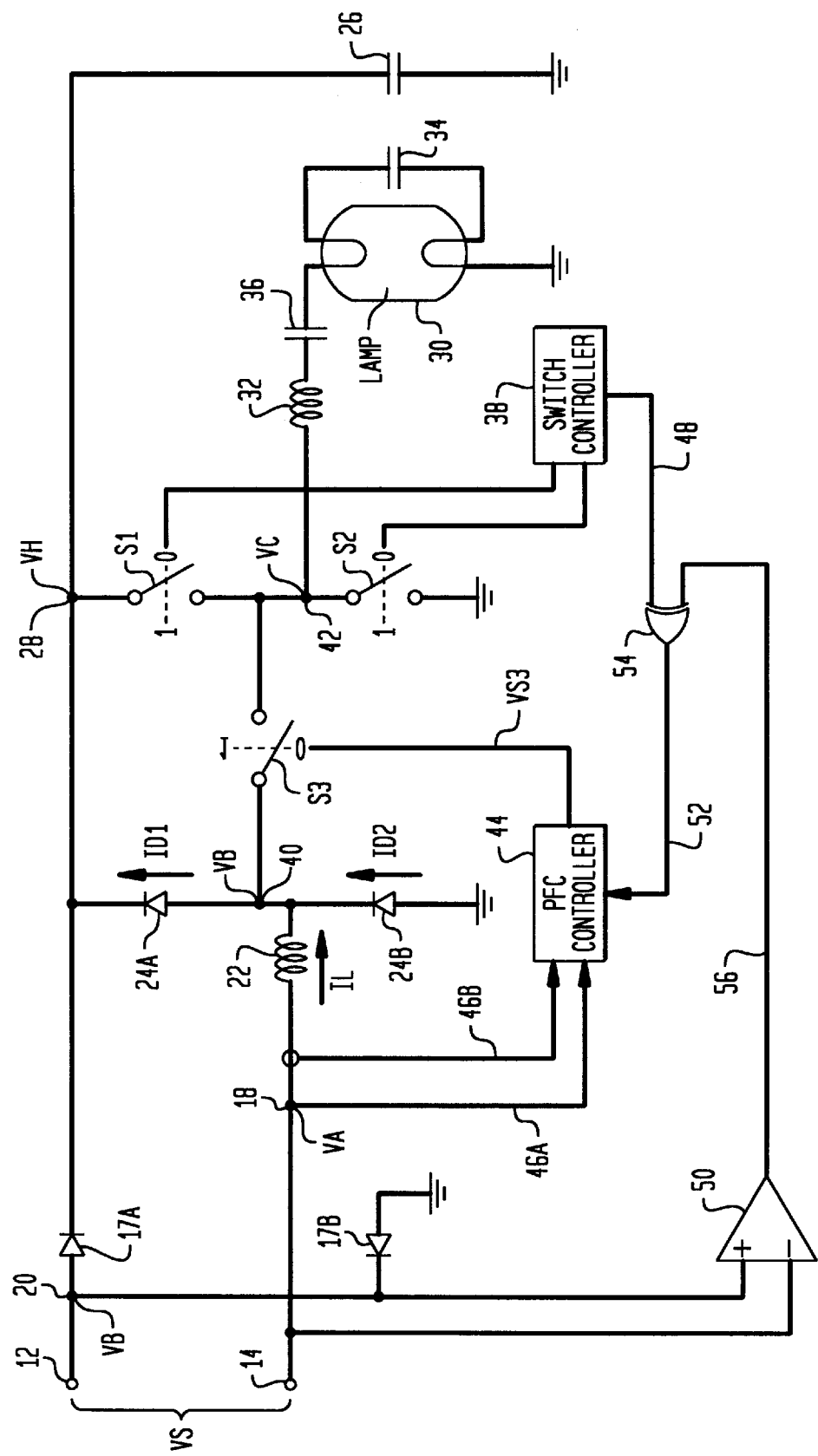
FIG. 1 is a simplified schematic diagram of a boost power converter, according to one embodiment of the present invention.

FIG. 1 is a simplified schematic diagram of a boost power converter, according to one embodiment of the present invention. Power converter 10 is adapted to receive an alternating source voltage V from an external power source. Power converter 10 is also adapted to receive a load, in this case a fluorescent lamp, and to power the load with an alternating voltage. Source voltage VS is applied to input terminals 12 and 14 by an AC power source (not shown), such as a 60-Hz, 110-volt main line. Inductor 22 provides a boosted-up voltage through diodes 24A and 24B to capacitor 26. Capacitor 26 provides an energy storage device that stores a high voltage VH at node 28. High voltage VH is in the range of approximately 215 to 225 volts, and therefore, is substantially larger than the peak of source voltage VS. Lamp 30 is configured to receive power from a resonant circuit that includes resonant inductor 32 and resonant capacitor 34. DC blocking capacitor 36 provides appropriate voltage shifting for lamp 30.

Upper switch S1 is connected between one side of capacitor 26 and the resonant circuit, and lower switch S2 is connected between the other side of capacitor 26, which is labeled ground, and the resonant circuit. Upper switch S1 is alternately switched with lower switch S2 at a constant frequency to provide alternating current flow through the resonant circuit and lamp 30. When switch S1 is closed and switch S2 is opened, high voltage VH is applied to inductor 32. When switch S1 is open and switch S2 is closed, substantially zero voltage is applied to inductor 32. Switches S1 and S2 are preferably high voltage gating or switching devices such as one or more transistors. Switch controller 38 operates switches S1 and S2 at a switching frequency that corresponds to the predetermined resonant frequency of the resonant circuit. Preferably, switches S1 and S2 operate at approximately a 50% duty cycle.

Switches S1 and S2 also operate with zero-voltage switching. That is, a brief time interval ("dead time") is provided between turning off switch S1 and turning on switch S2, and between turning off switch S2 and turning on switch S1. This dead time allows energy stored in parasitic capacitance at node 42 to be transferred to inductor 32 instead of being dissipated in the switches. The combination of switches S1 and S2, capacitor 26, inductor 32 and capacitor 34, and switch controller 38 provides a resonator which operates in a substantially fully resonant mode for powering lamp 30.

A boost circuit includes switch S3 connected between nodes 40 and 42, and power-factor correction (PFC) controller 44, in conjunction with diodes 24A, 24B and capacitor 26. PFC controller 44 operates switch S3 in response to voltage VA at node 18, inductor current IL through node 18 (and through inductor 22), and a control signal from switch controller 38. In particular, PFC controller 44 senses the voltage and current at node 18 via sense lines 46a and 46b, respectively, and receives a control signal from switch controller 38 via signal lines 48 and 52 through selective inverter 54. PFC controller 44 regulates inductor current IL so that the magnitude of inductor current IL is directly proportional to the magnitude of voltage VA. Inductor current IL discharges through diode 24A or 24B (depending on the phase of input voltage VS) into capacitor 26 to provide high voltage VH.

Power converter 10 operates in two different modes that depend on the phase of input voltage VS. In the positive mode, the voltage at terminal 14 is higher than the voltage at terminal 12, while, in the negative mode, the voltage at terminal 12 is higher than the voltage at terminal 14. In the positive mode, positive current is stored in inductor 22 and discharged through diode 24A into capacitor 26. In the negative mode, negative current is stored in inductor 22 and discharged through diode 24B into capacitor 26. Comparator 50 detects the polarity of VS and controls selective inverter 54 (shown in FIG. 1 as an XOR gate). When terminal 14 is higher than terminal 12, the level on line 56 is low, the state of line 52 is the same as the state of line 48, and power converter 10 operates in the positive mode. Alternately, when terminal 12 is higher than terminal 14, the level on line 56 is high, the state of line 52 is the opposite of the state of line 48, and power converter 10 operates in the negative mode.

Positive Mode of Operation

In the positive mode of operation, switch S3 closes at substantially the same time that switch S1 closes, shortly after switch S2 opens. In this configuration, voltage VB (at node 40) and resonant voltage VC (at node 42) are pulled to high voltage VH (at node 28). Since inductor 22 forces voltage VA at node 18 to be equal to voltage VH at node 28, diode 16B is reverse biased, and inductor 22 is prevented from charging. Thereafter, switch S1 opens while switch S3 remains closed, voltages VB and VC are pulled to ground, and inductor 22 begins to charge. After switch S1 opens, but before switch S2 closes (dead time), voltages VB and VC are reduced non-abruptly by the resonant circuit. Thereafter, switch S2 closes, voltages VB and VC are grounded, and inductor 22 is coupled directly to ground and charges. In this way, switch S3 takes advantage of the zero-voltage switching at node 42, so that the boost circuit need not "hard switch" to ground.

PFC controller 44 determines when inductor 22 should transition from charging to discharging in response to voltage VA and inductor current IL. PFC controller 44 causes inductor 22 to discharge by opening switch S3 while switch S1 remains open and switch S2 remains closed. When switch S3 opens, node 40 is decoupled from ground, voltage VB rises rapidly to approximately high voltage VH, and inductor current IL begins to discharge through diode 24A into capacitor 26. As inductor 22 discharges, switches S1 and S3 close and switch S2 opens. However, this does not substantially affect inductor 22 since voltages VA and VB are largely unaffected. Inductor 22 finishes discharging while switches S1 and S3 remain closed and switch S2 remains open. At this point, inductor 22 forces voltage VA at node 18 to be equal to voltage VH at node 28, diode 17B is reverse biased, and inductor 22 is prevented from charging. Inductor 22 charges again when switch S1 opens and switch S2 closes during the next cycle. In this manner, PFC controller 44 provides an efficient power-factor correction scheme by assuring that inductor current IL is in phase with rectified voltage VA.

Diodes 17B and 24A have a relatively high reverse breakdown voltage and a fast reverse recovery time to prevent capacitor 26 from dumping a significant amount of current back through the diodes.

PFC controller 44 is slaved to switch controller 38 through selective inverter 54. That is, switch controller 38 opens and closes switching devices S1 and S2 at a switching frequency that provides efficient power transfer to the resonant circuit, and PFC controller 44 operates switch S3 to accommodate the switching frequency. In the positive mode of operation, PFC controller 44 operates switch S3 so that switch S3 closes (goes from opened to closed) while switch S1 closes and switch S2 is open, and switch S3 opens (goes from closed to opened) while switch S1 is open and switch S2 is closed. Switches S1 and S3 close at substantially the same time by switch controller 38 sending synchronous signals to switch S1 and PFC controller 44.

Negative Mode of Operation

In the negative mode of operation, switch S3 closes at substantially the same time that switch S2 closes, shortly after switch S1 opens. In this configuration, voltage VB (at node 40) and resonant voltage VC (at node 42) are pulled to ground. Since inductor 22 forces voltage VA at node 18 to be equal to ground, diode 16A is reverse biased, and inductor 22 is prevented from charging. Thereafter, switch S2 opens while switch S3 remains closed, voltages VB and VC are pulled to voltage VH (at node 28), and inductor 22 begins to charge. After switch S2 opens, but before switch S1 closes (dead time), voltages VB and VC are increased non-abruptly by the resonant circuit. Thereafter, switch S1 closes, voltages VB and VC are pulled to voltage VH, and inductor 22 is coupled directly to node 28 and charges. In this way, switch S3 takes advantage of the zero-voltage switching at node 42, so that the boost circuit need not "hard switch" to voltage VH.

PFC controller 44 determines when inductor 22 should transition from charging to discharging in response to voltage VA and inductor current IL. PFC controller 44 causes inductor 22 to discharge by opening switch S3 while switch S2 remains open and switch S1 remains closed. When switch S3 opens, node 40 is decoupled from voltage VH, voltage VB falls rapidly to approximately ground, and inductor current IL begins to discharge through diode 24B into capacitor 26. As inductor 22 discharges, switches S2 and S3 close and switch S1 opens. However, this does not substantially affect inductor 22 since voltages VA and VB are largely unaffected. Inductor 22 finishes discharging while switches S2 and S3 remain closed and switch S1 remains open. At this point, inductor 22 forces voltage VA at node 18 to be equal to ground, diode 17A is reverse biased, and inductor 22 is prevented from charging. Inductor 22 charges again when switch S2 opens and switch S1 closes during the next cycle. In this manner, PFC controller 44 provides an efficient power-factor correction scheme by assuring that inductor current IL is in phase with rectified voltage VA.

Diodes 17A and 24B have a relatively high reverse breakdown voltage and a fast reverse recovery time to prevent capacitor 26 from dumping a significant amount of current back through the diodes.

In the negative mode of operation, PFC controller 44 operates switch S3 so that switch S3 closes (goes from opened to closed) while switch S2 closes and switch S1 is open, and switch S3 opens (goes from closed to opened) while switch S2 is open and switch S1 is closed. Switches S2 and S3 close at substantially the same time by switch controller 38 sending synchronous signals to switch S2 and PFC controller 44.

If desired, optional capacitors (not shown) can be connected between node 40 and ground and/or between node 42 and ground to further limit the slew rates of voltages VB and/or VC, respectively. A capacitor at VB also serves to maintain the voltages at VB at the approximate level of VC until switch S3 closes.

Conceptually, power converter 10 of FIG. 1 can be said to have an energy storage device (e.g., capacitor 26 in FIG. 1), a resonant circuit (e.g., inductor 32, capacitor 34, and DC blocking capacitor 36 in FIG. 1), a resonator switch circuit (e.g., switches S1 and S2 and switch controller 38 in FIG. 1), a boost inductor circuit (e.g., inductor 22 and diodes 17A-B and 24A-B), and boost switch circuit (e.g., switch S3, PFC controller 44, comparator 50, and selective inverter 54 in FIG. 1). The resonator switch circuit is adapted to alternately connect the resonant circuit to different sides of the energy storage device, wherein power from the energy storage device is transferred by the resonant circuit to a load (e.g., a fluorescent lamp). The boost switch circuit is adapted to selectively connect the boost inductor circuit to the resonator switch circuit and the resonant circuit, such that an inductor of the boost inductor circuit is charged in one of two different directions depending on the phase of an AC source.

By itself, a boost converter consisting of the boost inductor circuit and the boost switch circuit is a non-resonant circuit. However, since such a boost converter in power converter 10 of FIG. 1 employs the substantially fully resonant circuit to drive node 40 between the two sides of capacitor 26, the boost converter can be referred to as a quasiresonant circuit.

Example of Operation

FIG. 2 is a waveshape diagram illustrating signal waveshapes of power converter 10. With reference to FIG. 1, source voltage VS is applied between terminals 12 and 14, resonant voltage VC occurs at node 42, control voltage VS3 is a control signal sent from PFC controller 44 to switch S3, inductor current IL flows bidirectionally through inductor 22 (with the direction depending on the operating mode), diode current ID1 flows through diode 24A, diode current ID2 flows through diode 24B, and voltage VB occurs at node 40. When control voltage VS3 is high, switch S3 is closed, and, when control voltage VS3 is low, switch S3 is open.

The resonator provides resonant voltage VC. When switch S1 is turned on (closed) and switch S2 is turned off (open), resonant voltage VC is at high voltage VH. Likewise, when switch S1 is turned off (open) and switch S2 is turned on (closed), resonant voltage VC is at ground and is substantially zero. Resonant voltage VC has sloped rising and falling edges due to the zero-voltage switching of switches S1 and S2. For convenience of explanation, capacitor 26 is already charged to high voltage VH.

At the beginning of time period T1P, switch S1 is opened, and shortly thereafter, switch S2 is closed, and resonant voltage VC falls to substantially zero. Since switch S3 remains closed, voltage VB follows resonant voltage VC to ground, and voltage VA becomes larger than voltage VB. As a result, positive inductor current IL rises, and energy is stored in inductor 22 according to the formula $$V_{inductor} = L(di/dt)$$

where Vinductor is the differential voltage VA-VB, di/dt is the rate of change of inductor current IL, and L is the inductance of inductor 22. Thus, inductor 22 begins to charge at substantially the same time that resonant voltage VC is pulled to ground. Diode current ID1 remains substantially zero since voltage VB, at ground, reverse biases diode 24A.

Later during time period T1P, PFC controller 44 determines that inductor 22 has charged long enough. Accordingly, PFC controller 44 lowers control voltage VS3 to open switch S3. Opening switch S3 causes inductor 22 to discharge its stored energy through diode 24A into capacitor 26. As a result, voltage VB rises to approximately high voltage VH. In particular, voltage VB rises to high voltage VH plus the threshold voltage of diode 24A, which is assumed to be negligible. As inductor 22 discharges, inductor current IL decreases and diode current ID1 follows inductor current IL. Since the magnitude of voltage VS is relatively high during time period T1P, inductor current IL charges at a relatively high rate and discharges at a relatively low rate.

At the beginning of time period T2P, switch S2 is opened, and shortly thereafter switches S1 and S3 are closed. As a result, resonant voltage VC rises to high voltage VH. Since voltages VA and VB are largely unaffected, inductor 22 continues to discharge at essentially the same relatively low rate as in time period T1P. For convenience of explanation, it is assumed that the inductor current continues to discharge through diode 24A into capacitor 26, and diode current ID1 continues to match inductor current IL. It is understood, however, that a portion of inductor current IL may actually flow through switch S3 and switch S1, and that another portion of inductor current IL may discharge into the resonant circuit. The precise current flow will depend on the relative resistances of various circuit elements. In any event, later during time period T2P, inductor 22 is substantially discharged and currents IL and ID1 go to substantially zero. The discharge of inductor 22 provides the boost voltage to store high voltage VH in capacitor 26.

At the time beginning of time period T3P, switch S1 is opened, and shortly thereafter switch S2 is closed and resonant voltage VC is taken to ground. While control voltage VS3 remains high, switch S3 remains closed, voltage VB follows resonant voltage VC to ground, and voltage VA becomes larger than voltage VB. Therefore, inductor current IL rises as inductor 22 begins to charge. Later during time period T3P, PFC controller 44 lowers control voltage VS3 which opens switch S3, causing voltage VB to rise, and inductor 22 discharges through diode 24A into capacitor 26. The declining inductor current IL is matched by diode current ID1.

At the beginning of time period T4P, switch S2 is opened, and shortly thereafter switches S1 and S3 are closed. As a result, resonant voltage VC rises to high voltage VH. Since voltages VA and VB are largely unaffected, inductor 22 continues to discharge at essentially the same rate as in time period T3P. Eventually during time period T4P, inductor 22 substantially discharges and currents IL and ID1 go to substantially zero.

At the beginning of time period T5P, switch S1 is opened, and shortly thereafter switch S2 is closed, and resonant voltage VC is taken to ground. While control voltage VS3 remains high, switch S3 remains closed and voltage VB follows resonant voltage VC to ground. Again, inductor current IL rises as inductor 22 begins to charge. Later during time period T5P, PFC controller 44 lowers control voltage VS3 which opens switch S3, causing voltage VB to rise, and inductor 22 discharges through diode 24A into capacitor 26. The declining inductor current IL is matched by diode current ID1. Since the magnitude of voltage VS is relatively low during time period T5P, inductor current IL charges at a relatively low rate and discharges at a relatively high rate.

At the beginning of time period T1N, switch S1 is opened, and shortly thereafter, switch S2 is closed, and resonant voltage VC increases to VH. Since switch S3 remains closed, voltage VB follows resonant voltage VC to VH, and voltage VA becomes smaller than voltage VB. As a result, negative inductor current IL rises, and energy is stored in inductor 22. Thus, inductor 22 begins to charge at substantially the same time that resonant voltage VC is pulled to VH. Diode current ID2 remains substantially zero, since voltage VB at VH reverse biases diode 24B.

Later during time period T1N, PFC controller 44 determines that inductor 22 has charged long enough. Accordingly, PFC controller 44 lowers control voltage VS3 to open switch S3. Opening switch S3 causes inductor 22 to discharge its stored energy through diode 24B to capacitor 26. As a result, voltage VB falls to approximately ground. In particular, voltage VB falls to ground plus the threshold voltage of diode 24B, which is assumed to be negligible. As inductor 22 discharges, inductor current IL decreases and diode current ID2 follows inductor current IL. Since the magnitude of voltage VS is relatively high during time period T1N, inductor current IL charges at a relatively high rate and discharges at a relatively low rate.

At the beginning of time period T2N, switch S2 is opened, and shortly thereafter switches S1 and S3 are closed. As a result, resonant voltage VC falls to ground. Since voltages VA and VB are largely unaffected, inductor 22 continues to discharge at essentially the same relatively low rate as in time period T1N. For convenience of explanation, it is assumed that the inductor current continues to discharge through diode 24B into capacitor 26, and diode current ID2 continues to match inductor current IL. It is understood, however, that a portion of inductor current IL may actually flow through switch S3 and switch S1, and that another portion of inductor current IL may discharge into the resonant circuit. The precise current flow will depend on the relative resistances of various circuit elements. In any event, later during time period T2N, inductor 22 is substantially discharged and currents IL and ID2 go to substantially zero. The discharge of inductor 22 again provides the boost voltage to store high voltage VH in capacitor 26.

At the beginning of time period T3N, switch S1 is opened, and shortly thereafter switch S2 is closed and resonant voltage VC is taken to VH. While control voltage VS3 remains high, switch S3 remains closed, voltage VB follows resonant voltage VC to VH, and voltage VA becomes smaller than voltage VB. Therefore, negative inductor current IL rises as inductor 22 begins to charge. Later during time period T3N, PFC controller 44 lowers control voltage VS3 which opens switch S3, causing voltage VB to fall, and inductor 22 discharges through diode 24B into capacitor 26. The declining inductor current IL is matched by diode current ID2.

At the time beginning of time period T4N, switch S2 is opened, and shortly thereafter switches S1 and S3 are closed. As a result, resonant voltage VC falls to ground. Since voltages VA and VB are largely unaffected, inductor 22 continues to discharge at essentially the same rate as in time period T3N. Eventually during time period T4N, inductor 22 substantially discharges and currents IL and ID2 go to substantially zero.

At the beginning of time period T5N, switch S1 is opened, and shortly thereafter switch S2 is closed and resonant voltage VC is taken to VH. While control voltage VS3 remains high, switch S3 remains closed and voltage VB follows resonant voltage VC to VH. Again, negative inductor current IL rises as inductor 22 begins to charge. Later during time period T5N, PFC controller 44 lowers control voltage VS3 which opens switch S3, causing voltage VB to fall, and inductor 22 discharges through diode 24B into capacitor 26 The declining inductor current IL is matched by diode current ID2. Since the magnitude of voltage VS is relatively low during time period T5N, inductor current IL charges at a relatively low rate and discharges at a relatively high rate.

The magnitude of VS is larger during time periods T1P and T1N than during time periods T5P and T5N. As a result, PFC controller 44 permits inductor current IL to attain a higher peak during time periods T1P and T1N than during time periods T5P and T5N. Since inductor current IL charges at a greater rate during time periods T1P and T1N than during time periods T5P and T5N, PFC controller 44 opens switch S3 (by lowering control voltage VS3) earlier during time periods T1P and T1N than during time periods T5P and T5N. Thus, inductor current IL has a shorter charge duration during time periods T1P and T1N than during time periods T5P and T5N. Likewise, since inductor current IL discharges from a larger peak and at a slower rate during time periods T1P and T1N than during time periods T5P and T5N, inductor current IL takes longer to discharge during time periods T1P and T1N than during time periods T5P and T5N, even though the discharge begins sooner during time periods T1P and T1N than during time periods T5P and T5N. Furthermore, both the relatively high and low charge and discharge rates of inductor 22 create a low slew rate at node 40, which avoids significant harmonic distortion.

It can be seen that the peak integral inductor current IL corresponds to the peaks of the magnitude of voltage VA, that is, the peak integral inductor current IL is higher at the higher magnitudes of voltage VA. Thus, the current drawn from the power source is approximately in direct phase relation with the voltage of the power source.

It is apparent to one skilled in the art that the direct phase relation improves as the switching frequency of switches S1, S2, and S3 increases. FIG. 2 is therefore drawn to facilitate better understanding of the invention, but in actual operation, the switching frequencies of switches S1, S2, and S3 are much higher in comparison to the power source than as appears in FIG. 2.

A method for powering a load with an AC signal is apparent from the foregoing. The method includes applying the AC signal to an inductor, selectively coupling the inductor to a resonant circuit, applying a boosted voltage from the inductor to an energy storage device, and alternately applying energy from the energy storage device to the resonant circuit for powering the load. The method may include, for instance, coupling the inductor to the resonant circuit to begin charging the inductor, decoupling the inductor from the resonant circuit to begin discharging the inductor through a rectifier into the energy storage device, and alternately applying energy by zero-voltage switching.

The boost power converter of the present invention can be implemented with many other configurations. For instance, a battery can provide the energy storage device, other rectifiers can replace diodes 17A, 17B, 24A, and 24B, and the boost circuit can be operated in a continuous mode. In addition, during the positive mode of operation, switch S3 can be closed at any time while switch S1 is closed. Analogously, during the negative mode of operation, switch S3 can be closed at any time while switch S2 is closed. The invention is well suited for driving a variety of loads, including high-intensity discharge lamps.

It is understood that while the present invention has been described in terms of several illustrative embodiments, other arrangements and methods of operation will be apparent to those of ordinary skill in the art. Therefore, the invention should be limited only by the spirit and scope of the appended claims.

What is claimed is:

1. A boost power converter for powering a load with an AC power source, comprising:
   (a) an energy storage device;
   (b) a resonant circuit;
   (c) a resonator switch circuit adapted to alternately connect the resonant circuit to different sides of the energy storage device, wherein power from the energy storage device is transferred by the resonant circuit to the load;
   (d) a boost inductor circuit; and
   (e) a boost switch circuit electrically coupled between the boost inductor circuit and the resonator switch circuit and adapted to selectively connect the boost inductor circuit to the resonator switch circuit, such that a boost inductor of the boost inductor circuit is charged in one of two different directions depending on the phase of the AC power source.

2. The invention of claim 1, wherein the load comprises a fluorescent lamp.

3. The invention of claim 1, wherein the resonator switch circuit is configured for substantially fully resonant, zero-voltage switching.

4. The invention of claim 1, wherein:
   the resonant circuit comprises a resonant inductor and a resonant capacitor;
   the resonator switch circuit comprises a first switching device and a second switching device, each electrically coupled to the resonant circuit and configured for zero-voltage switching;
   the energy storage device comprises a capacitor electrically coupled to the first and second switching devices;
   the boost inductor is electrically coupled to the AC power source;
   the boost switch circuit comprises a third switching device electrically coupled between the boost inductor and the first and second switching devices; and
   the boost power converter operates in either a first operating mode or a second operating mode, depending on the phase of the AC power source.

5. The invention of claim 4, wherein:
   in the first operating mode, the third switching device is configured to remain closed when the first switching device opens and when the second switching device closes; and
   in the second operating mode, the third switching device is configured to remain closed when the second switching device opens and when the first switching device closes.

6. The invention of claim 5, wherein:
   in the first operating mode, the third switching device is configured to close at substantially the same time that the first switching device closes; and
   in the second operating mode, the third switching device is configured to close at substantially the same time that the second switching device closes.

7. The invention of claim 4, wherein the boost switch circuit further comprises a power-factor correction controller configured to control the third switching device to cause a bidirectional current through the boost inductor in phase with a voltage of the AC power source.

8. The invention of claim 7, wherein:
   in the first operating mode, the power-factor correction controller is configured to open the third switching device in response to a voltage of the AC power source, while the first switching device is open and the second switching device is closed, in order to discharge the boost inductor and provide a high power factor; and
   in the second operating mode, the power-factor correction controller is configured to open the third switching device in response to a voltage of the AC power source, while the second switching device is open and the first switching device is closed, in order to discharge the boost inductor and provide a high power factor.

9. The invention of claim 4, wherein the first and second switching devices are configured to zero-voltage switch the resonant circuit between the different sides of the energy storage device.

10. The invention of claim 4, wherein the first, second, and third switching devices are configured to zero-voltage switch the boost inductor between the different sides of the energy storage device.

11. The invention of claim 4, wherein the first, second, and third switching devices and the resonant circuit are each electrically coupled to a common node.

12. The invention of claim 4, wherein the first and second switching devices are configured for switching at approximately a 50% duty cycle.

13. The invention of claim 4, wherein the energy storage device is configured to provide a higher voltage than a peak of the AC power source.

14. A method for powering a load with an AC power source, comprising the steps of:

(a) applying the AC power source through a boost inductor;

(b) selectively coupling the boost inductor to a resonator switch circuit with a boost switch circuit electrically coupled between the boost inductor and the resonator switch circuit to cause a bidirectional current through the boost inductor in phase with a voltage of the AC power source;

(c) applying a boosted voltage from the boost inductor to an energy storage device; and (d) alternately applying energy from the energy storage device to a resonant circuit for powering the load.

15. The method of claim 14, wherein:

step (b) comprises the step of coupling the boost inductor to the resonator switch circuit to begin charging the inductor;

step (c) comprises the step of decoupling the boost inductor from the resonant circuit to discharge the inductor into the energy storage device; and step (d) comprises the step of zero-voltage switching.

16. The method of claim 14, wherein the load comprises a fluorescent lamp.

17. A boost power converter for powering a load with an AC power source, comprising:

(a) an energy storage device;

(b) a resonant circuit;

(c) a resonator switch circuit adapted to alternately connect the resonant circuit to different sides of the energy storage device, wherein power from the energy storage device is transferred by the resonant circuit to the load;

(d) a boost inductor circuit; and (e) a boost switch circuit adapted to selectively connect the boost inductor circuit to the resonator switch circuit, such that a boost inductor of the boost inductor circuit is charged in one of two different directions depending on the phase of the AC power source, wherein:

the resonant circuit comprises a resonant inductor and a resonant capacitor;

the resonator switch circuit comprises a first switching device and a second switching device, each electrically coupled to the resonant circuit and configured for zero-voltage switching;

the energy storage device comprises a capacitor electrically coupled to the first and second switching devices;

the boost inductor is electrically coupled to the AC power source;

the boost switch circuit comprises a third switching device electrically coupled between the boost inductor and the first and second switching devices; and the boost power converter operates in either a first operating mode or a second operating mode, depending on the phase of the AC power source.

18. The invention of claim 17, wherein:

in the first operating mode, the third switching device is configured to remain closed when the first switching device opens and when the second switching device closes;

in the second operating mode, the third switching device is configured to remain closed when the second switching device opens and when the first switching device closes;

in the first operating mode, the third switching device is configured to close at substantially the same time that the first switching device closes; and in the second operating mode, the third switching device is configured to close at substantially the same time that the second switching device closes.

19. The invention of claim 17, wherein the boost switch circuit further comprises a power-factor correction controller configured to control the third switching device to cause a bidirectional current through the boost inductor in phase with a voltage of the AC power source, wherein:

in the first operating mode, the power-factor correction controller is configured to open the third switching device in response to a voltage of the AC power source, while the first switching device is open and the second switching device is closed, in order to discharge the boost inductor and provide a high power factor; and in the second operating mode, the power-factor correction controller is configured to open the third switching device in response to a voltage of the AC power source, while the second switching device is open and the first switching device is closed, in order to discharge the boost inductor and provide a high power factor.

20. The invention of claim 17, wherein:

the first and second switching devices are configured to zero-voltage switch the resonant circuit between the different sides of the energy storage device;

the first, second, and third switching devices are configured to zero-voltage switch the boost inductor between the different sides of the energy storage device;

the first, second, and third switching devices and the resonant circuit are each electrically coupled to a common node;

the first and second switching devices are configured for switching at approximately a 50% duty cycle; and the energy storage device is configured to provide a higher voltage than a peak of the AC power source.

* * * * *